US 8,857,104 B2

(12) United States Patent
Ishigaki et al.

(10) Patent No.: US 8,857,104 B2
(45) Date of Patent: Oct. 14, 2014

(54) VEHICLE DOOR OPENING DEVICE

(71) Applicant: Mitsui Kinzoku Act Corporation, Yokohama (JP)

(72) Inventors: Hiroshi Ishigaki, Yokohama (JP); Kazuhito Yokomori, Yokohama (JP)

(73) Assignee: Mitsui Kinzoku Act Corporation (JP)

( * ) Notice: Subject to any disclaimer, the term of this patent is extended or adjusted under 35 U.S.C. 154(b) by 0 days.

(21) Appl. No.: 13/911,725

(22) Filed: Jun. 6, 2013

(65) Prior Publication Data
US 2013/0333290 A1 Dec. 19, 2013

(30) Foreign Application Priority Data

Jun. 19, 2012 (JP) ................................. 2012-137568
Nov. 8, 2012 (JP) ................................. 2012-246289

(51) Int. Cl.
*E05F 15/10* (2006.01)
*B60J 5/06* (2006.01)
*E05F 15/14* (2006.01)

(52) U.S. Cl.
CPC ........... *E05F 15/10* (2013.01); *E05Y 2201/216* (2013.01); *E05Y 2201/10* (2013.01); *E05Y 2201/672* (2013.01); *E05Y 2600/626* (2013.01); *B60J 5/06* (2013.01); *E05F 15/146* (2013.01)
USPC .............................................. 49/360; 49/209

(58) Field of Classification Search
USPC ..................................... 49/208, 209, 358, 360
See application file for complete search history.

(56) References Cited

U.S. PATENT DOCUMENTS

| | | | | |
|---|---|---|---|---|
| 5,319,881 A * | 6/1994 | Kuhlman | .......................... | 49/360 |
| 5,884,433 A * | 3/1999 | Watanabe et al. | ............... | 49/360 |
| 6,866,250 B2 * | 3/2005 | Kita | .............................. | 254/225 |
| 7,100,326 B2 * | 9/2006 | Shimada et al. | ................ | 49/360 |
| 7,191,563 B2 * | 3/2007 | Yokomori | ........................ | 49/360 |
| 7,287,804 B2 * | 10/2007 | Yamagishi et al. | ........... | 296/155 |
| 7,422,094 B2 * | 9/2008 | Yokomori | ..................... | 192/84.7 |
| 7,434,354 B2 * | 10/2008 | Yokomori | ........................ | 49/360 |
| 7,568,310 B2 * | 8/2009 | Sato et al. | ........................ | 49/360 |
| 7,703,838 B2 * | 4/2010 | Yokomori | ..................... | 296/155 |
| 7,774,985 B2 * | 8/2010 | Miyagawa et al. | ............. | 49/360 |
| 7,815,242 B2 * | 10/2010 | Yoshida et al. | ............. | 296/146.4 |
| 7,854,093 B2 * | 12/2010 | Yoshida et al. | ................. | 49/360 |
| 7,866,732 B2 * | 1/2011 | Oxley | ............................. | 296/155 |
| 7,930,855 B2 * | 4/2011 | Yoshida et al. | ................. | 49/360 |
| 8,011,136 B2 * | 9/2011 | Fukumura et al. | .............. | 49/360 |
| 8,109,041 B2 * | 2/2012 | Kita | .................................. | 49/360 |
| 8,256,161 B2 * | 9/2012 | Nagai et al. | ..................... | 49/360 |
| 8,322,074 B2 * | 12/2012 | Kita et al. | ........................ | 49/360 |
| 2004/0003542 A1 * | 1/2004 | Shimada et al. | ................ | 49/360 |
| 2004/0195419 A1 * | 10/2004 | Yamagishi et al. | ......... | 242/365.6 |
| 2005/0039405 A1 * | 2/2005 | Yokomori | ........................ | 49/360 |

(Continued)

FOREIGN PATENT DOCUMENTS

JP 2008-184879 8/2008

*Primary Examiner* — Katherine Mitchell
*Assistant Examiner* — Justin Rephann
(74) *Attorney, Agent, or Firm* — Ostrolenk Faber LLP

(57) ABSTRACT

A vehicle door opening device comprises a drive unit, an opening cable and a closing cable. The drive unit comprises a housing, a motor mounted to the housing and having armature, and a drum rotated by the motor. At a vertex of the housing, an exterior angle was approximately right angles. The axis of the armature is perpendicular to a side of the housing having the vertex at the end. The drive unit can be made smaller.

7 Claims, 18 Drawing Sheets

(56) References Cited

U.S. PATENT DOCUMENTS

| | | | |
|---|---|---|---|
| 2005/0253414 A1* | 11/2005 | Yokomori | 296/146.4 |
| 2006/0032142 A1* | 2/2006 | Yokomori | 49/324 |
| 2007/0163179 A1* | 7/2007 | Fukumura et al. | 49/360 |
| 2008/0000161 A1* | 1/2008 | Nagai et al. | 49/360 |
| 2008/0036317 A1* | 2/2008 | Miyagawa et al. | 310/83 |
| 2008/0060272 A1* | 3/2008 | Kita | 49/334 |
| 2008/0179919 A1* | 7/2008 | Yoshida et al. | 296/202 |
| 2009/0107048 A1* | 4/2009 | Nagai et al. | 49/280 |

* cited by examiner

VEHICLE DOOR OPENING DEVICE

BACKGROUND OF THE INVENTION

The present invention relates to a vehicle door opening device for opening and closing a vehicle door by a motor.

In JP2008-184879A, a vehicle door opening device comprises a resin case (corresponding to "a housing" in this embodiment) attached to a vehicle body as a drive unit. The case has an electric motor as drive source, a reduction-mechanism holding portion for a reduction mechanism that reduces the rotation of the electric motor, a cylindrical drum-holding portion having a driving drum on which a cable attached at one end to a door is wound to transmit power of the electric motor to the door, and a tensioner-holding portion for a tensioner mechanism for applying certain tension to the cable. A cover for closing the tensioner-holding portion is attached to the case, and a fixing portion for mounting the drive unit to the vehicle body is provided.

However, in the vehicle door opening device in JP2008-184879A, as seen along the shaft for the drive drum, a tensioner holding portion is disposed under the drum-holding portion in the case and the electric motor is disposed above the drum-holding portion. The electric motor projects from the casing to increase an occupation area of the drive unit to the vehicle body, which is likely to give adverse effect to the layout of other parts. Even during the transportation of the drive unit, the drive unit is bulky to make transportation efficiency decreased.

SUMMARY OF THE INVENTION

In view of the foregoing disadvantages, it is an object of the invention to provide a vehicle door opening device enabling a drive unit to become smaller.

DETAILED DESCRIPTION OF PREFERRED EMBODIMENTS

Figure 1:
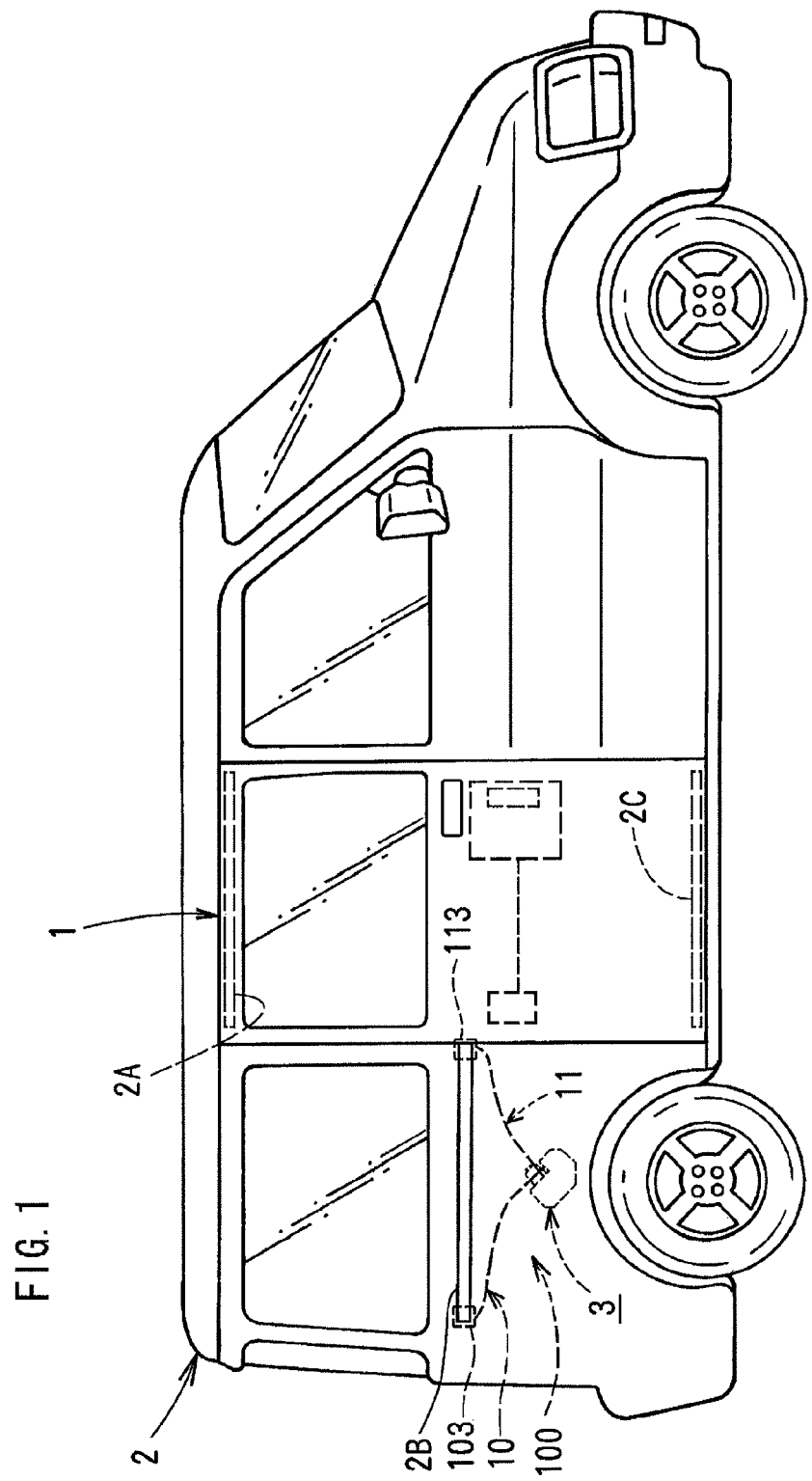
FIG. 1 is a side view of a vehicle to which a vehicle door opening device according to the present invention is applied.
Figure 4:
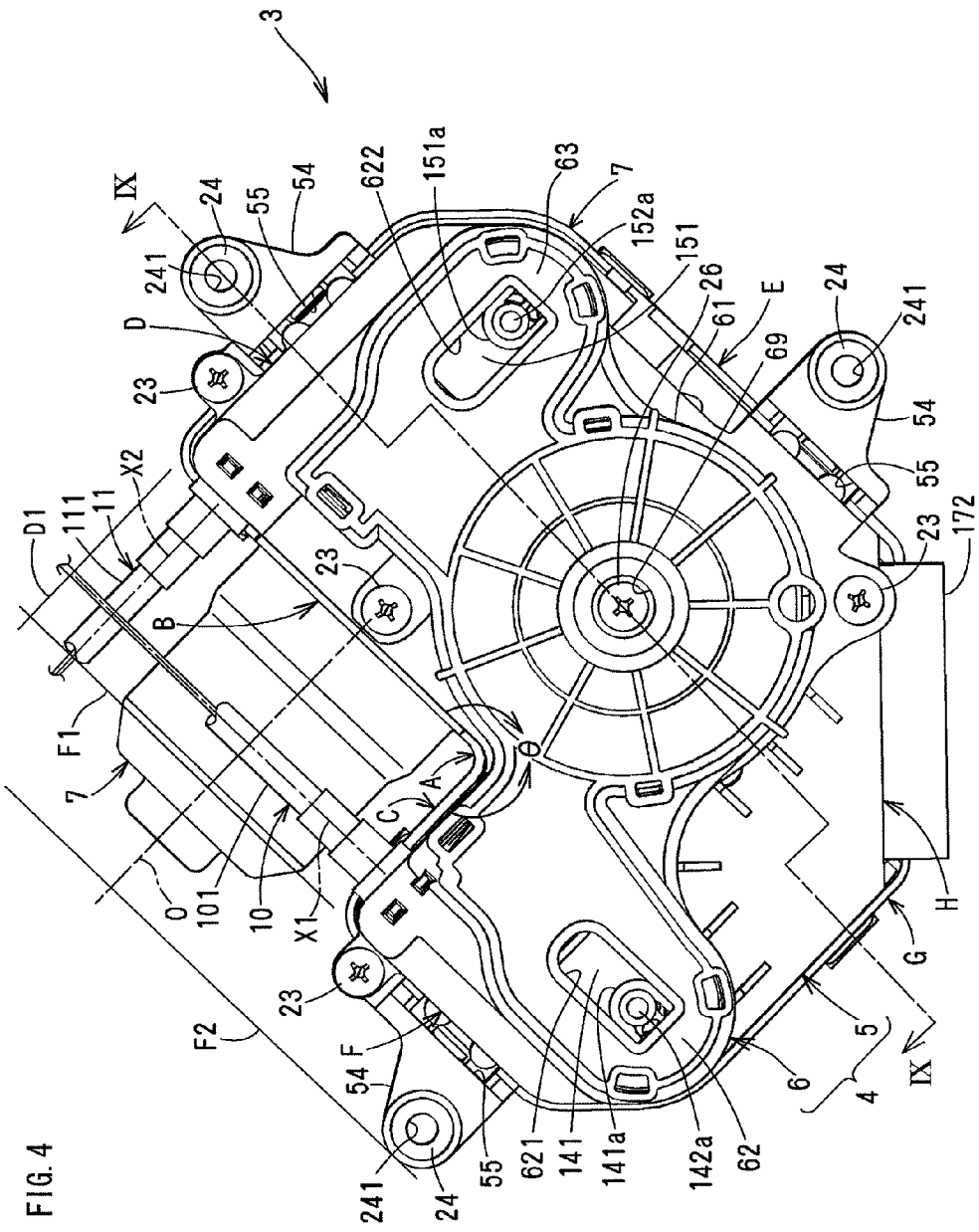
FIG. 4 is a front view of the drive unit seen from the inside of the vehicle.
Figure 5:
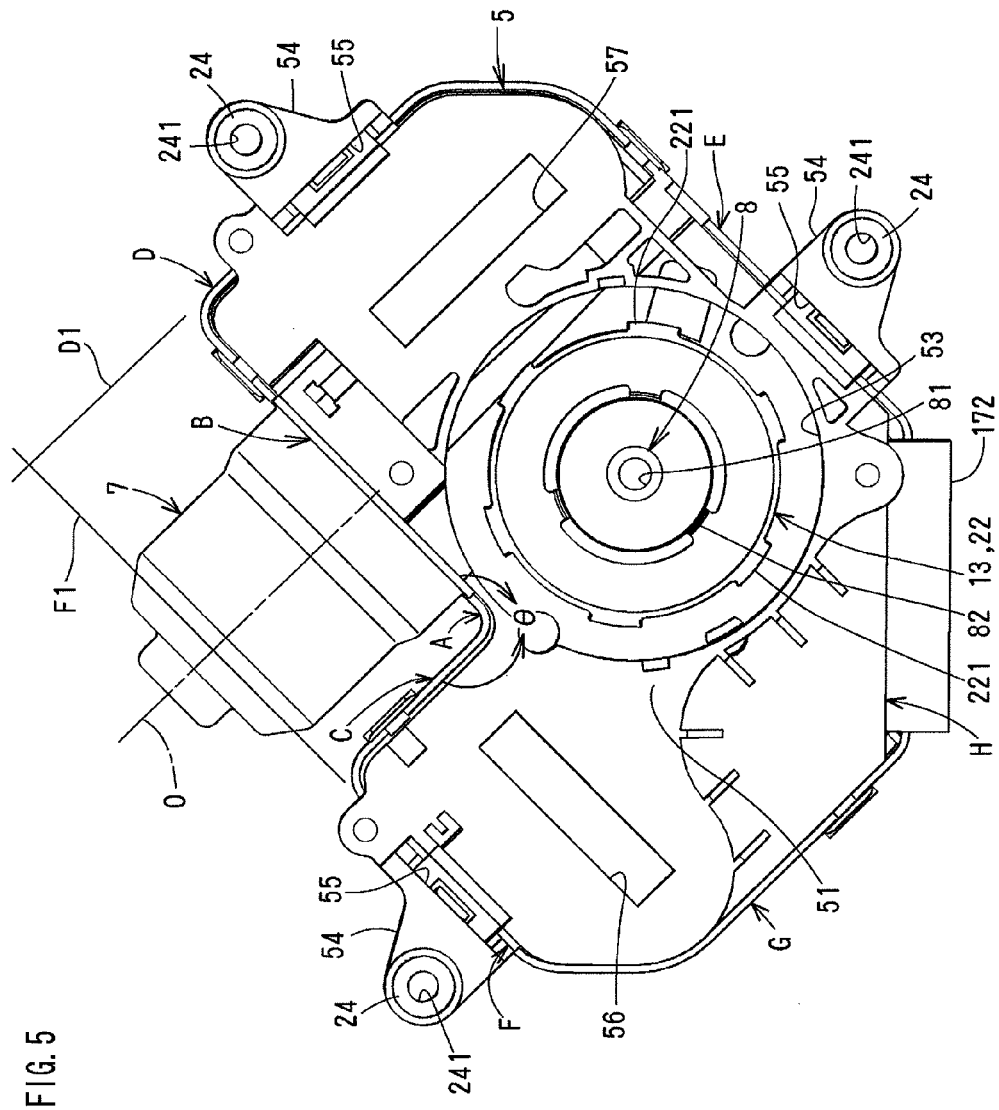
FIG. 5 is a front view of a drive subassembly of the drive unit seen from the inside of the vehicle.

An embodiment of the present invention will be described with respect to the drawings. In the following description, the right side in FIG. 1 and left sides in FIGS. 4 and 5 are deemed as "front" of a vehicle, while the left side in FIG. 1 and right sides in FIGS. 4 and 5 are deemed as "rear". The upper and lower sides in FIGS. 1, 4 and 5 are deemed as "upper and lower sides" of the vehicle. The back side in FIG. 1 and front sides in FIGS. 4 and 5 are deemed as "inside of the vehicle", while the front side in FIG. 1 and the back side in FIGS. 4 and 5 are deemed as "outside of the vehicle".

In FIG. 1, a sliding door 1 in a vehicle such as minivans or wagons is held along upper, center and lower guide rails 2A, 2B, 2C longitudinally extending on the side of a vehicle body 2 to move back and forth to open and close. The sliding door 1 can move from a fully-closed position where an entrance at the side of the vehicle body 2 is closed, to a fully-open position where the sliding door 1 moves somewhat outward from and rearward along the side of the vehicle body 2 and vice versa. A drive unit 3 shown in the drawings except FIG. 1 is for a left door which is disposed in the left-side panel of the vehicle body 2.

A vehicle door opening device 100 comprises the drive unit 3 disposed in the vehicle body 2, and an opening cable 10 and a closing cable 11 such as a Bowden cable for transmitting a force from the drive unit 3 to the door 1.

Figure 2:
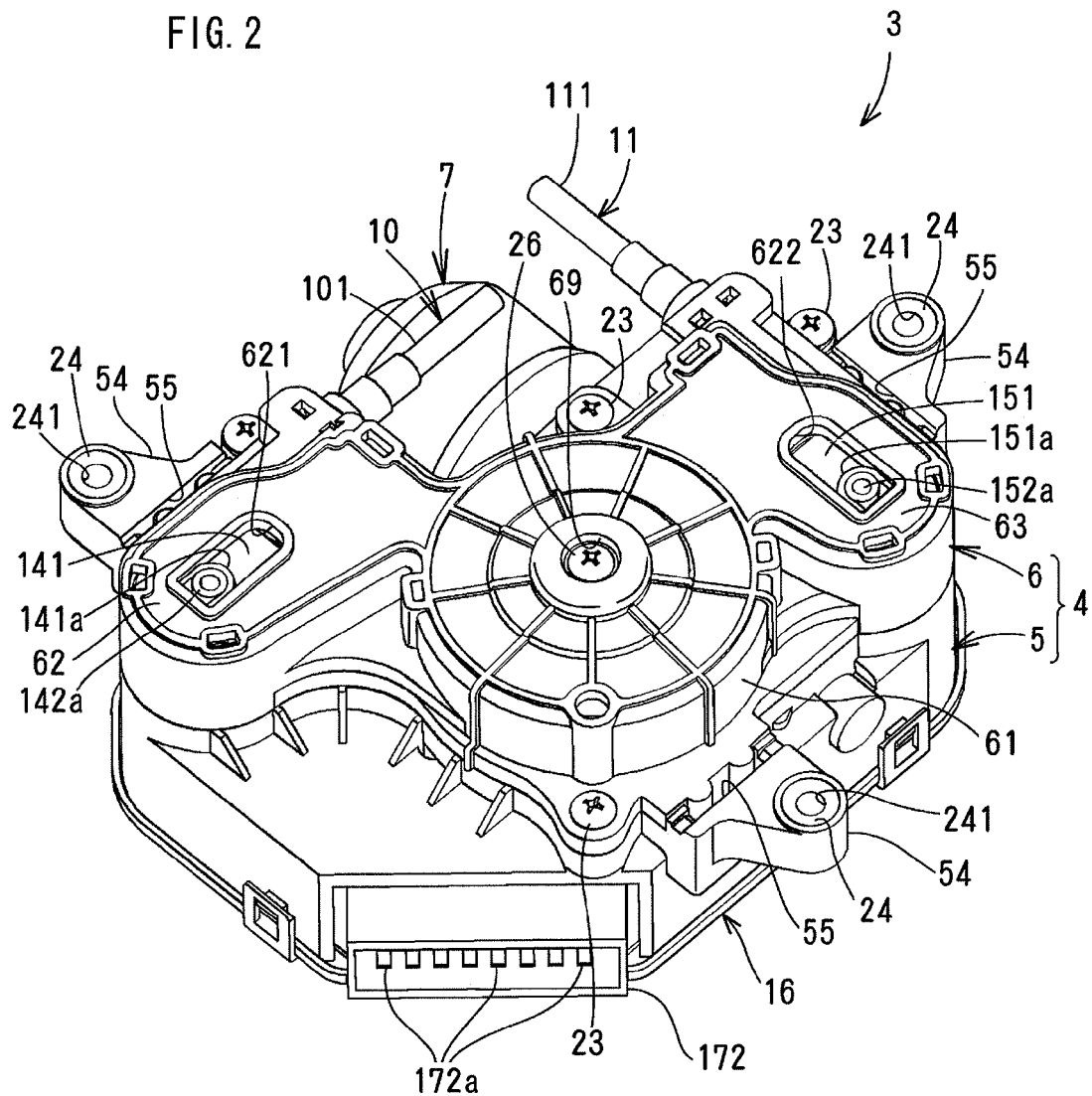
FIG. 2 is a perspective view of a drive unit in this invention.
Figure 3:
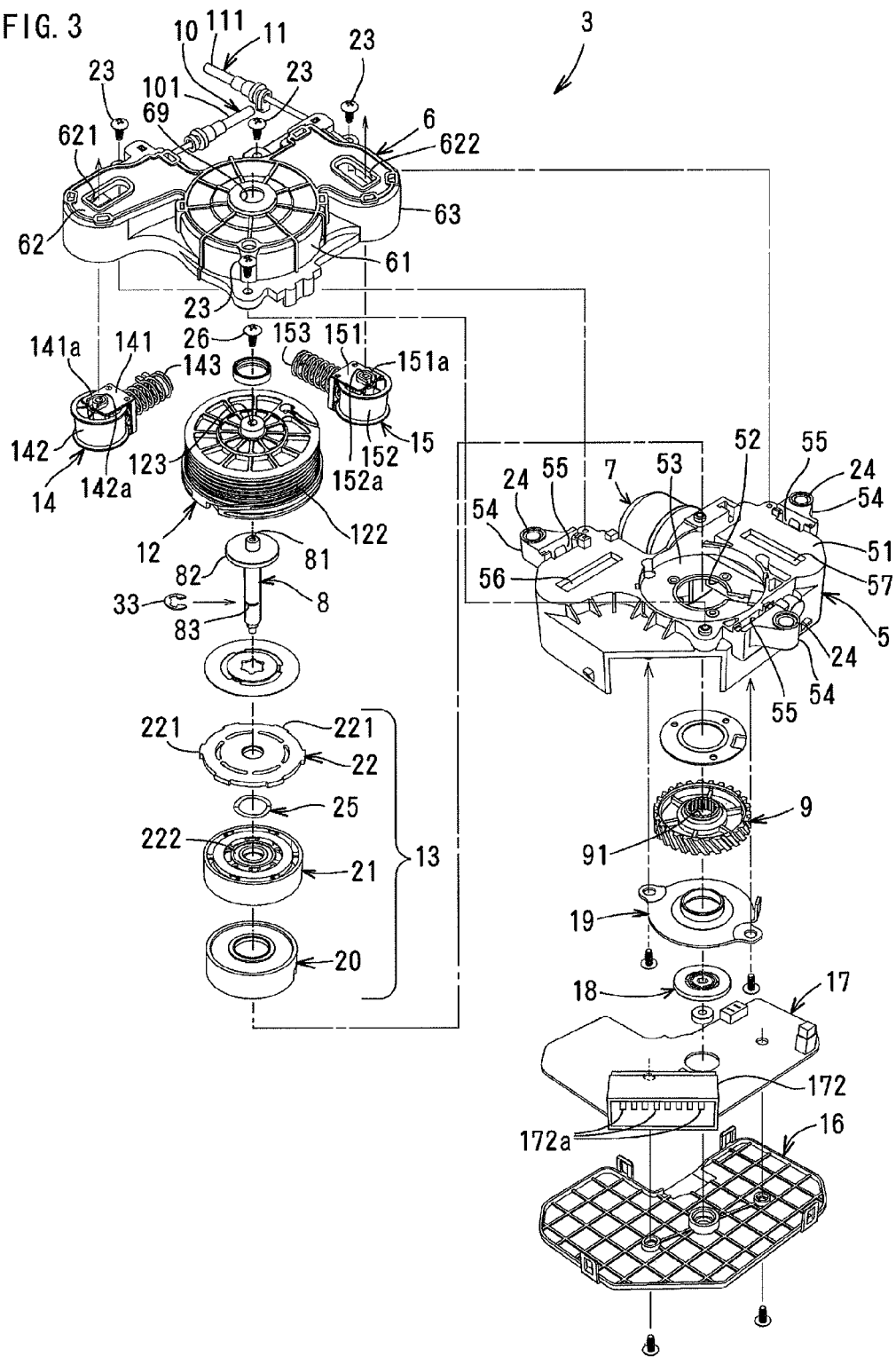
FIG. 3 is an exploded perspective view of the drive unit.

In FIGS. 2 and 3, the drive unit 3 comprises a housing 4 which comprises a first synthetic-resin housing part 5 fixed to the vehicle body 2 and a second synthetic-resin housing part 6 separate from the first housing part 5; a reversible motor 7; a worm wheel 9 rotatably mounted via a pivot shaft 8 in the housing 4 to reduce rotation speed of the motor to form a reduction gear; a drum 12 rotatably mounted via the pivot shaft 8; the opening cable 10 and the closing cable 11 wound on the drum 12; an electromagnetic clutch 13 for connecting and disconnecting power-transmission between the worm wheel 9 and the drum 12; and opening and closing tensioners 14,15 for applying certain tension to the opening cable 10 and closing cable 11. The second housing part 6 includes a synthetic resin cover 16 for closing the outer side (down in FIGS. 2 and 3).

In FIG. 4, the housing 4 in which the second housing part 6 is fixed over the first housing part 5 has an interior angle θ for approximately 270 degrees at a vertex and an exterior angle for approximately 90 degrees. As seen along the pivot shaft 8, the housing 4 has two sides B and C at each side of the vertex A; a side D connected to and approximately perpendicular to the side B; a side E connected to and approximately perpendicular to the side D; a side F connected to and approximately perpendicular to the side C; a side G parallel with C and connected to the side F; and a side H between the sides E and G, an interior angle of the side H with respect to the sides E and G being approximately 135 degrees, and comprises a polygon like an L.

In FIG. 5, the first housing part 5 has the vertex A, interior angle θ and sides B-H and has approximately the same shape as the housing 4.

Figure 6:
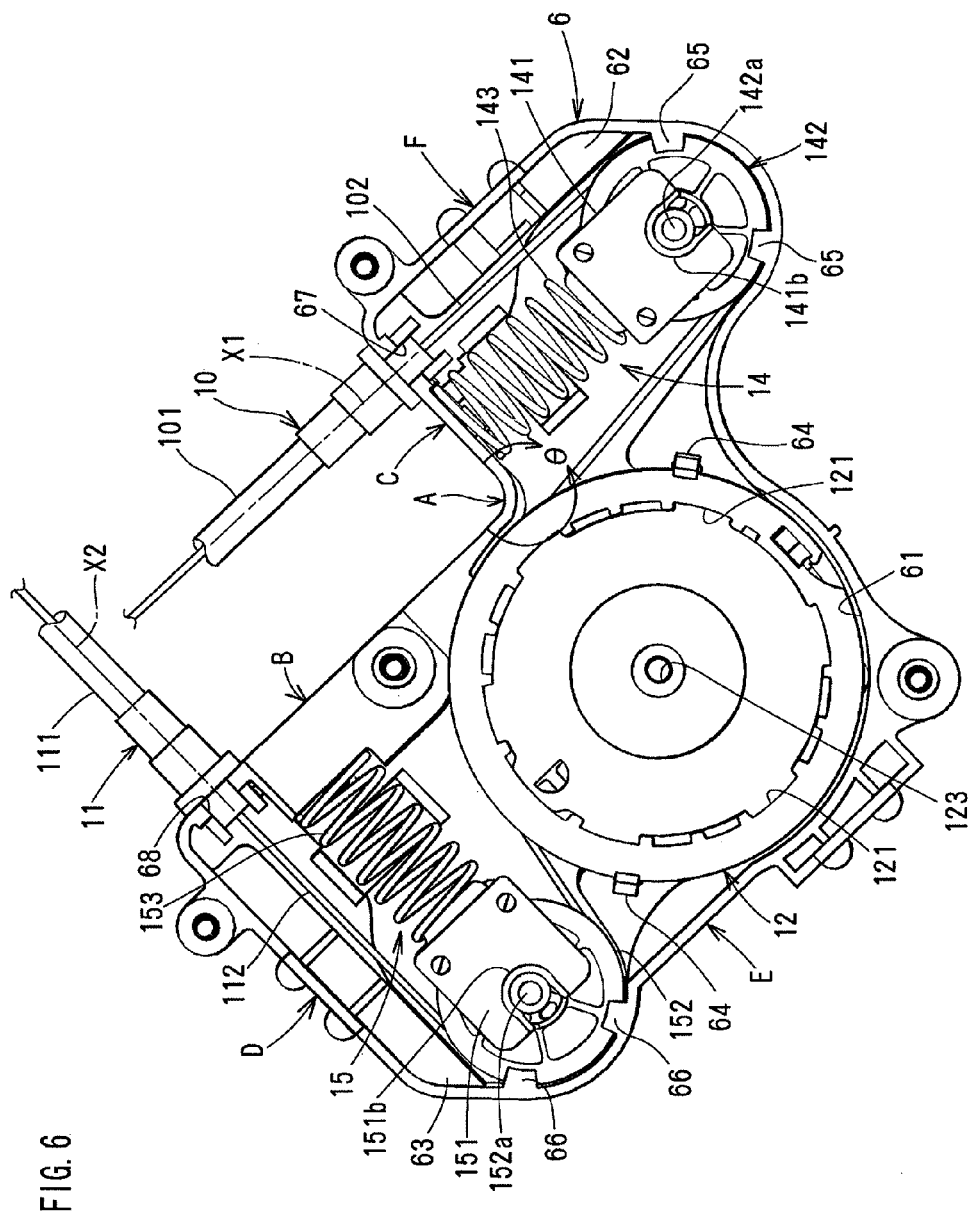
FIG. 6 is a back view of a driven subassembly of the drive unit seen from the outside of the vehicle.

Meanwhile, in FIG. 6, the second housing part 6 is curved at the front lower part (left lower part in FIG. 4 and right lower part in FIG. 6), and has the vertex A, interior angle θ and sides B-F without the sides G,H. The vertex A, interior angle θ and sides B-F of the first and second housing parts 5,6 are the same as the vertex A, interior angle θ and the sides B-F of the housing 4, and the sides G,H of the first housing part 5 are the same as the sides G,H of the housing 4.

The first housing part 5 has a base 51 having a vertical surface when the drive unit 3 is attached in the vehicle body 2; a circular hole 52 through which the pivot shaft 8 is disposed at the center of the base 51; a circular recess 53 in which the end of the electromagnetic clutch 13 is somewhat embedded around the circular hole 52; and a plurality of (three) attaching portions 54 projecting outward.

Figure 11:
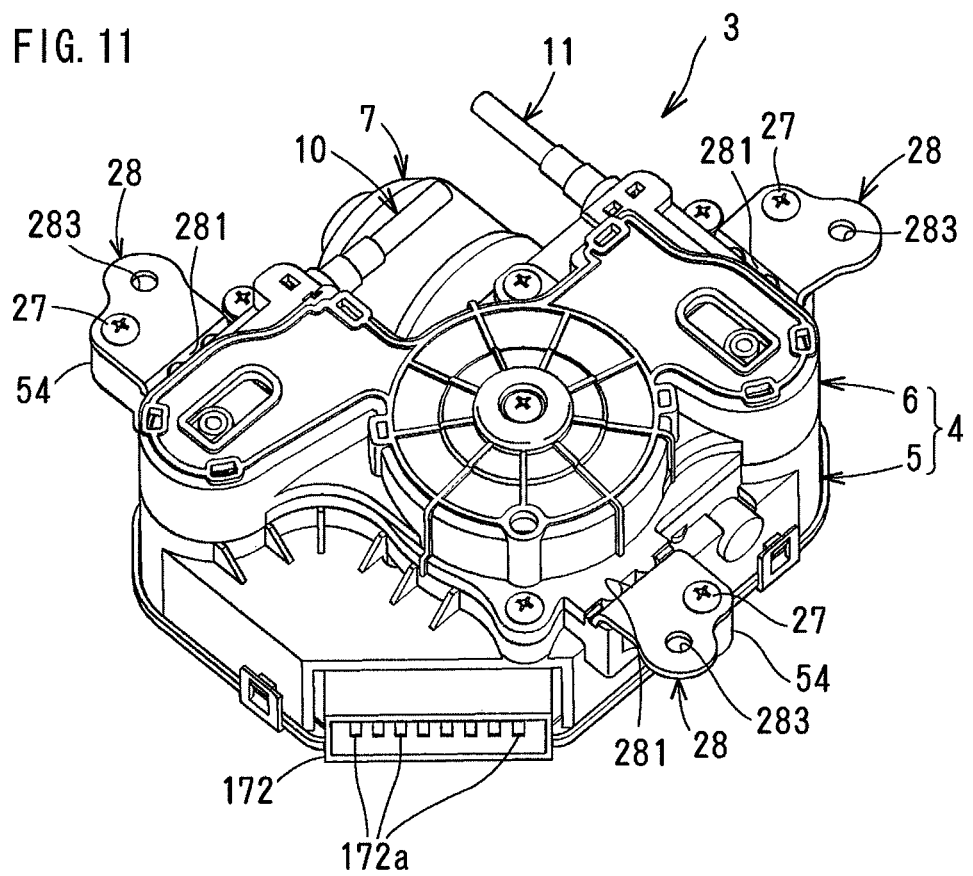
FIG. 11 is a perspective view of the drive unit to which a bracket is attached.

The attaching portions 54 are capable of being attached to attached portions of the vehicle body 2 with bolts 27. In order that the drive unit 3 may be attached in a different type of vehicle, the attaching portion 54 is fixed to a bracket 28 having a fixing portion 283 corresponding to the attached portion of the different type of vehicle in FIGS. 11 and 12 or to a bracket 29 having a fixing portion 293 in FIGS. 13 and 14 with the bolt 27. Depending on the type of vehicle having the attached portion to which the drive unit 3 is attached, the attaching portion 54 is directly fixed to the attached portion of the vehicle body, or the bracket 28 or 29 is selectively fixed to each of the attaching portions 54 of the first housing part 5 thereby enabling the first housing part 5 or drive unit 3 to be used in the different type of vehicle. In order that the bracket 28 may be fixed to the attaching portion 54, the fixing portion 283 of the bracket 28 is fixed to the attached portion with a bolt (not shown), and in order that the bracket 29 may be fixed to the attaching portion 54, the fixing portion 293 of the other bracket 29 is fixed to the attached portion with a bolt (not shown).

In the attaching portion 54, the bolt 27 and fixing portions 283,293 of the bolt 27 and the bracket 28 are fixed to the attached portion with a bolt (not shown). A nut 24 having a internal thread bore 241 in which the bolt engages is made by insert molding.

Figure 12:
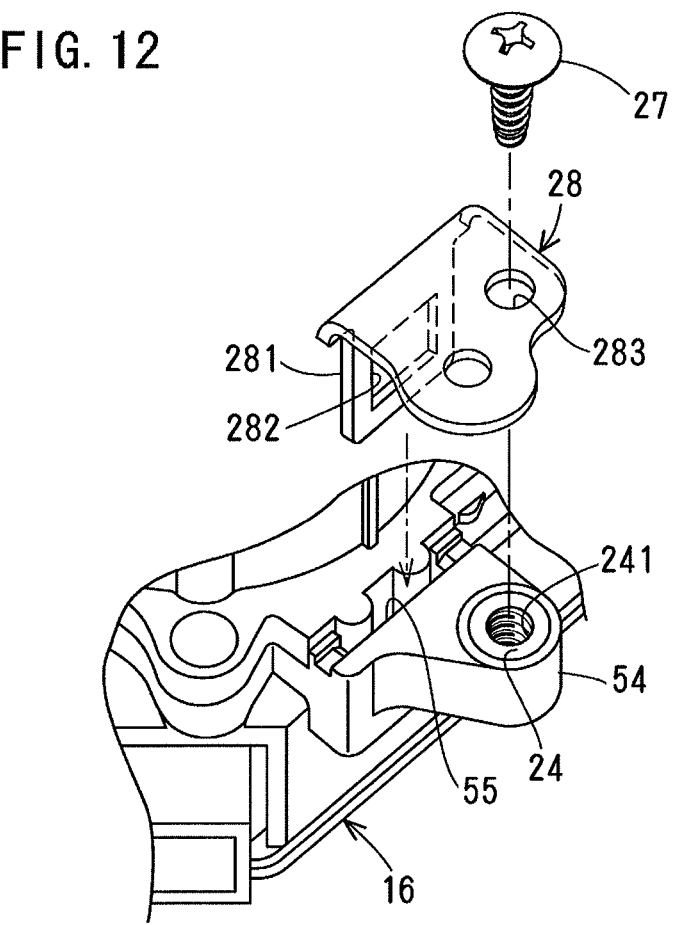
FIG. 12 is a perspective view before the bracket is attached to the drive unit.
Figure 13:
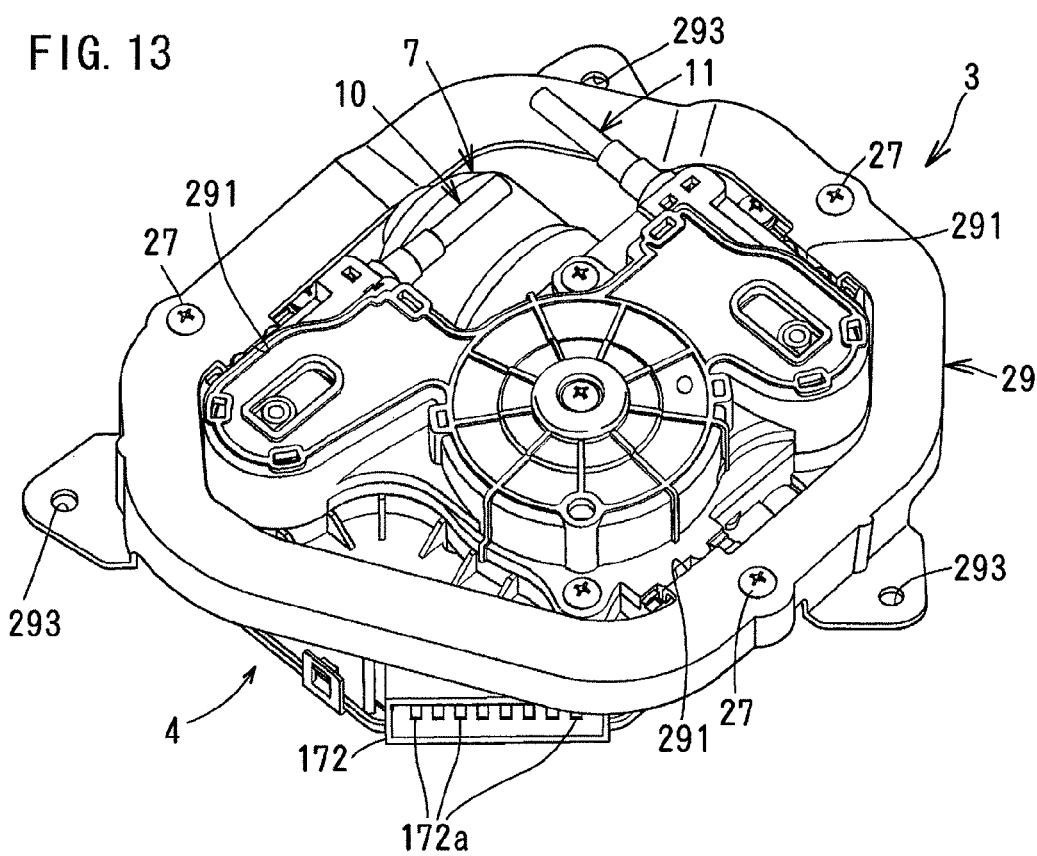
FIG. 13 is a perspective view of the drive unit to which another bracket is attached.
Figure 14:
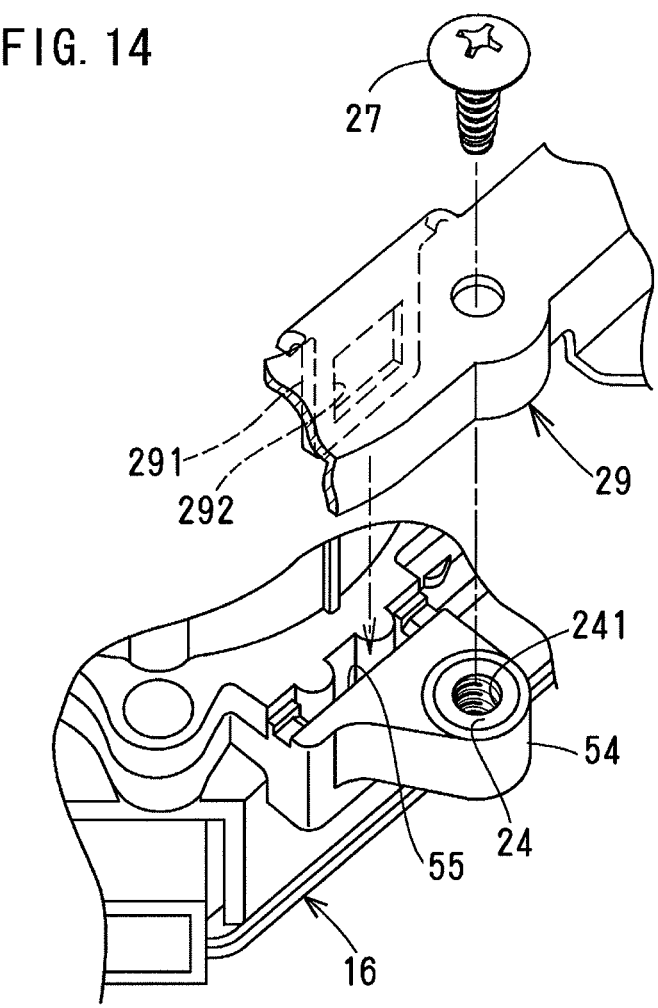
FIG. 14 is a perspective view before another bracket is attached to the drive unit.

Furthermore, close to the attaching portion 54 of the first housing part 5, there are engagement grooves 55 in which bent portions 281,291 of the brackets 28,29 in FIGS. 12 and 14 are capable of engaging. The engagement grooves 55 are parallel with the internal thread bore 241. On a wall around the engagement groove 55, there is formed a pawl 58 which engages with openings 282,292 of the bent portions 281,291. Thus, the brackets 28,29 each can be fixed to the attaching portion 54 with the bolt 27 firmly.

In FIGS. 4 and 5, the motor 7 is fixed to a mounting surface forming the side B of the first housing part 5 such that the axis O of an armature of the motor 7 is perpendicular to the side B and the axis of the opening cable 10 or introducing direction X1, and is parallel with the side C and the axis of the closing cable 11 or introducing direction X2. Hence, when the motor 7 is fixed to the housing 4, the part of the motor 7, particularly over 50%, is within a rectangle surrounded by the sides B and C, an extension D1 of the side D and an extension F1 of the side F. The motor 7 does not project greatly from the sides D,F of the housing 4, and the drive unit 3 is seen from the front like a rectangle thereby allowing an occupation area of the drive unit 3 to the vehicle body 2 to become the minimum, keeping the drive unit 3 from having an adverse effect on the layout of the other parts mounted to the vehicle body 2 and enabling the drive units 3 to be transported more efficiently without becoming too bulky. Preferably, at least the end of the axis O of the armature of the motor 7 may not project outward beyond a line F2 in parallel with the extended line F1. More preferably, the motor 7 may be entirely within the rectangle by reducing the axial length of the motor 7 or by extending the sides B,C slightly.

Between the base 51 and the cover 16 of the first housing part 5 are provided the worm wheel 9 pivotally mounted via the pivot shaft 8, a rotary plate 18 rotating with the pivot shaft 8, a worm wheel cover 19 fixed to the first housing 5, and a printed circuit board 17 on which printed circuits are placed.

The worm wheel 9 meshes with a worm (not shown) mounted to a shaft of the motor 7, and rotates by the motor 7. A rotation sensor 171 mounted on the mounting surface of the printed circuit board 17 detects the rotation of the rotary plate 18 rotating with the drum 12 via the pivot shaft 8, so that the rotation of the drum 12 is detected 12. A detected signal of the rotation sensor 171 which detects the rotation of the rotary plate 18 is transmitted to a control circuit device (not shown) of the vehicle body 2 by connecting an electric wire to one of a plurality of connecting terminals 172a fixed in a connector 172 mounted on the printed circuit board 17. The control circuit device performs arithmetic computations of a moving direction and a position of the door 1. To the other connecting terminals 172a of the connector 172 are connected electric wires for supplying electric power to the motor 7 and electromagnetic clutch 13.

The electromagnetic clutch 13 is disposed on the base 51 of the first housing part 5 facing the second housing part 6. The electromagnetic clutch 13 is disposed within the drum 12 and comprises an approximately cylindrical field core 20 made of magnetic material fixed to the base 51 and having an electromagnetic coil, a rotor 21 rotatably mounted around the field core 20 via the pivot shaft 8 passing through the center of the field core 20 and an armature 22 around a frictional surface of the rotor 21 to slightly slide axially along the pivot shaft 8.

The field core 20 is fixed to a circular recess 53 of the first housing part 5. The rotor 21 made of magnetic material covers, the outer circumference of the field core 20 and has a bearing tube 211 which projects oppositely to a frictional surface (upper surface in FIGS. 9 and 10) and rotatably contacts the pivot shaft 8. The bearing tube 211 passes through the center of the field core 20 and the circular hole 52 of the first housing 5. The end of the bearing tube 211 fits in a central hole 91 of the warm wheel 9. Thus, the worm wheel 9 and rotor 21 rotate together with the pivot shaft 8.

The armature 22 is disposed within the drum 12 to slightly move axially of the pivot shaft 8. A plurality of engagement projections 221 on the outer circumference of the armature 22 engages in a plurality of engagement recesses 121 on the inner circumferential surface of the drum 21 in a rotational direction to rotate together with the drum 12.

Between the rotor 21 and armature 22 along the pivot shaft 8, a wave washier 25 is provided. The wave washier 25 is disposed in an annular groove 222 formed on the rotary surface of the rotor 21 to force so that the frictional surface of the armature 22 may go away from the frictional surface of the rotor 21.

Figure 9:
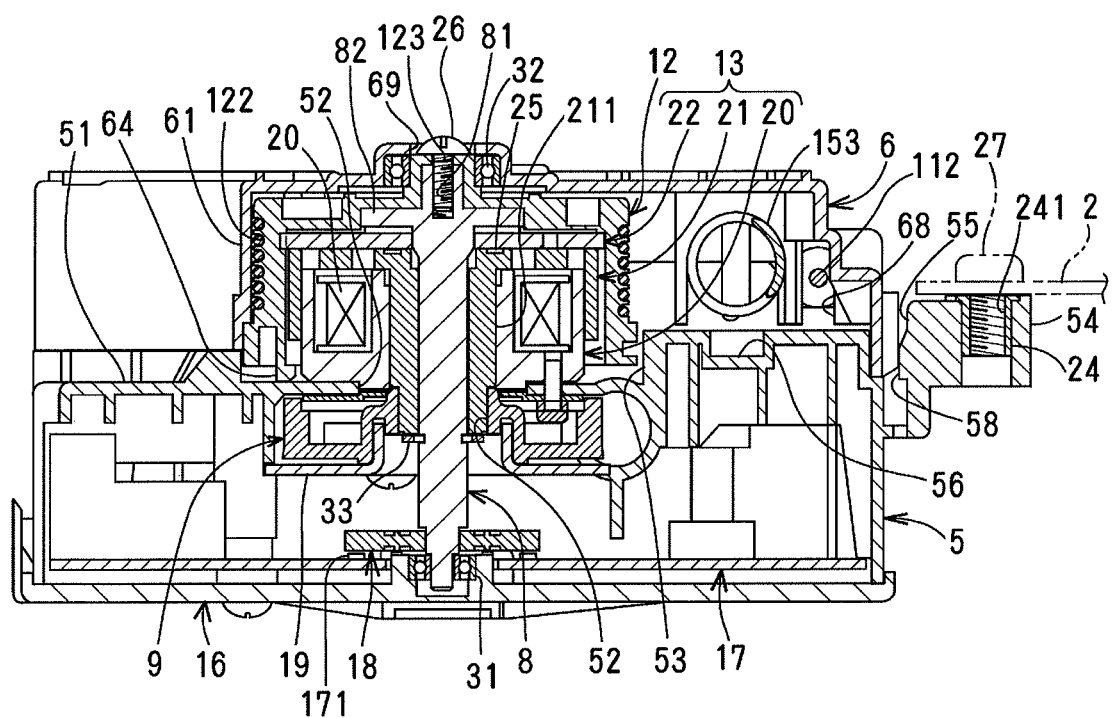
FIG. 9 is a sectional view taken along the line IX-IX in FIG. 4.
Figure 10:
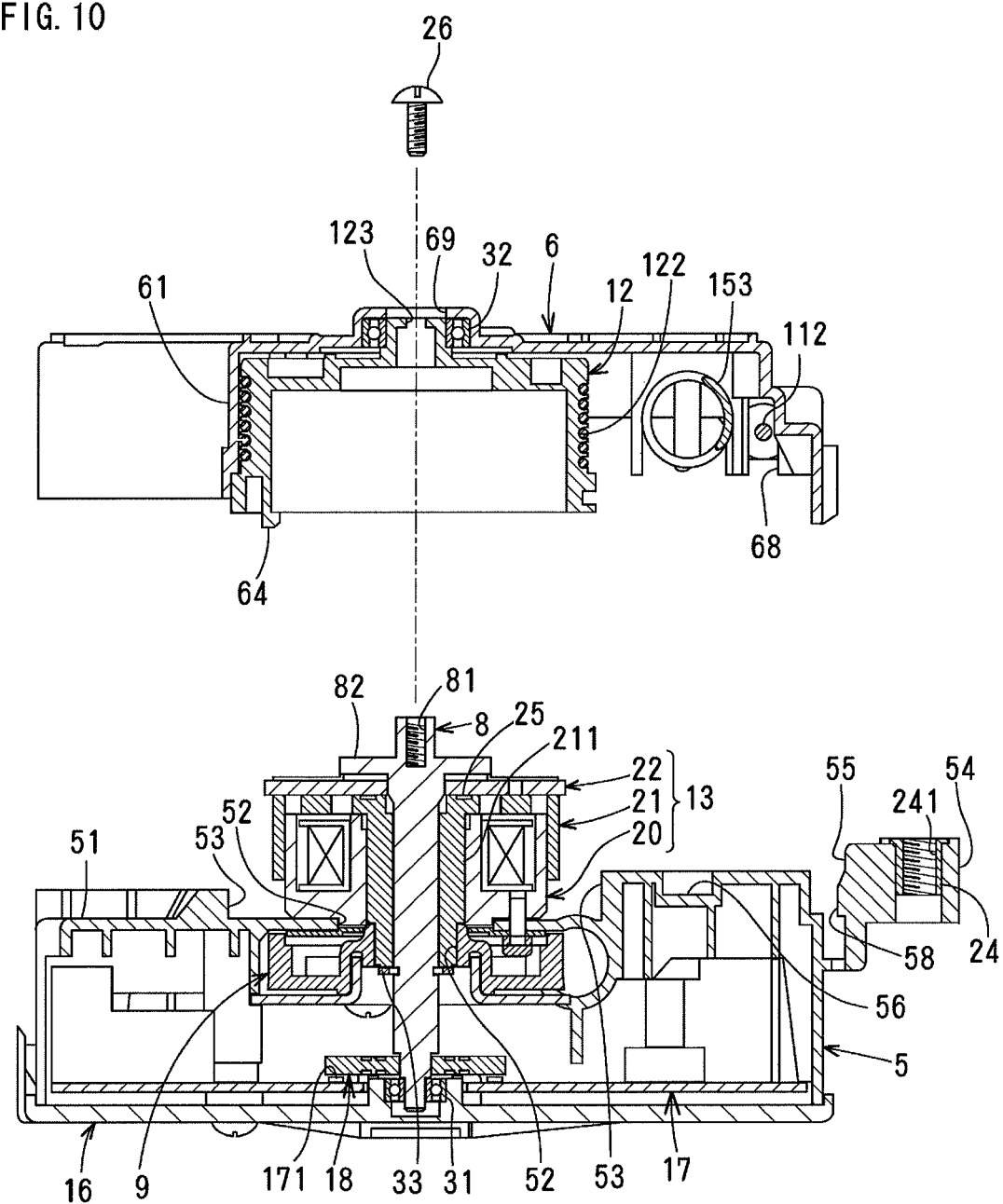
FIG. 10 is a sectional view similar to FIG. 9 but the drive subassembly is separate from the driven subassembly.

The pivot shaft 8 is rotatably mounted within the housing 4 via a ball bearing 31 of the first housing 5 and a ball bearing 32 of the second housing 6. An internal thread bore 81 is formed in the end face which faces the inside of the vehicle, and a collar 82 is provided. On the pivot shaft 8 close to the outside of the vehicle, there is formed a circumferential groove 83 in which an E-like washier 33 fits. In FIGS. 9 and 10, the worm wheel 9 and electromagnetic clutch 13 are held between the collar 82 of the pivot shaft 8 and the E-like washier 33 which fits in the circumferential groove 83.

When the electromagnetic clutch 13 is not energized or off, the power of the motor 7 is not transmitted to the drum 12 because the rotor 21 and armature 22 are disconnected from each other even if the worm wheel 9 turns by the motor 7. When the electromagnetic clutch 13 is energized or on, the armature 22 is attracted onto the frictional surface of the rotor 21 to enable the rotor 21 to be connected to the armature 22, so that power of the motor 7 is transmitted to the drum 12 via the worm wheel 9, rotor 21 and armature 22.

"Drive subassembly" as below is defined by a state in which the motor 7, pivot shaft 8, worm wheel 9, electromagnetic clutch 13 and printed circuit board 17 are connected to the first housing part 5, while "driven subassembly" is defined by a state in which the drum 12, tensioners 14,15 and cables 10,11 are connected to the second housing part 6. The electromagnetic clutch 13, printed circuit board 17 and tensioners 14,15 may be omitted depending on the type of vehicle.

The second housing part 6 is fixed with a bolt 23 at part close to the engagement groove 55 and another point, and comprises a bottom-having cylindrical drum-holding portion 61 for holding the drum 12 rotatably and tensioner holding portions 62,63 for holding the opening and closing tensioners 14,15.

The drum 12 is rotatably attached to the pivot shaft 8 in the drum holding portion 61 and fixed between the collar 82 of the pivot shaft 8 and the bolt 26 which is screwed in the internal thread bore 81. After the driven subassembly is connected to the drive subassembly, the bolt 26 is screwed in the internal thread bore 81 of the pivot shaft 8 from the circular hole 69 at the center of the second housing part 6 to the internal thread bore 81 through a central hole 123 of the drum 12. On the outer circumference of the drum 12, there is formed a helical groove 122 on which the inner cables 102, 112 of the cables 10,11 are wound.

The drum 12 is rotatably mounted in the housing 4. When the electromagnetic clutch 13 is energized, the power of the motor is transmitted to the drum 12 via the worm wheel 9, rotor 21 and armature 22. The drum 12 rotates with the pivot shaft 8.

In a final assembling step for connecting the driven subassembly to the drive subassembly, the second housing part 6 comprises two elastically-outward-deformable holding portions 64 for holding the drum 12 provisionally in the drum-holding portion 61 not to fall the drum 12 off the drum-holding portion 61; holding portions 65,66 for holding the tensioners 14,15 in the tensioner-holding portions 62,63 not to fall the tensioners 14,15 off the tensioner-holding portions 62,63; and cable-taking-out portions 67,68 for taking the cables 10,11 wound on the drum 12 out from the second housing part 6. The holding portions 64 each does not come in contact with the drum 12 when the driven subassembly is connected to the drive subassembly.

The cable-taking-out portions 67,68 are disposed on the surfaces which form the sides C,B of the second housing part 6 respectively. The opening cable 10 is taken out in a direction X perpendicular to the side C of the housing 4 and the axis O of the motor 7 and in parallel with the side B and crosses the motor 7. The closing cable 11 is taken out in a direction of X2 perpendicular to the side B of the housing 4 and in parallel with the side C and the axis of the motor 7. The opening cable 10 and closing cable 11 cross each other close to the motor 7 and within the extension D1 of the side D of the housing and F1.

The opening tensioner 14 comprises a U-shaped slider 141 slidable perpendicular to the side C in the tensioner-holding portion 62 of the second housing part 6 and in parallel with the taking-out direction X1 for the opening cable 10; a tension pulley 142 rotatably mounted via a shaft 142a to the sliding member 141 in parallel with the pivot shaft 8 transversely of the vehicle; and a coil spring 143 for applying a force to the tension pulley 142 via the slider 141 to move away from the side C.

The holding portion 65 of the tensioner-holding portion 62 of the second housing part 6 comes in contact with the tension pulley 142. Hence, the opening tensioner 14 is provisionally held not to fall off the tensioner-holding portion 62 when the driven subassembly is connected to the drive subassembly. A projection 141a of the slider 141 slides in an elongate hole 621 of the second housing part 6, and a projection 141b of the slider 141 slides in an elongate hole 56 to allow the slider 141 to slide between the first housing part 5 and the second housing part 6. The holding portion 65 is not in contact with the tension pulley 142 when the driven subassembly is connected to the drive subassembly.

The closing tensioner 15 comprises a U-shaped slider 151 which slides in a direction perpendicular to the side B or in a direction parallel with the taking-out direction X2 of the closing cable 11 in the tensioner-holding portion 63 of the second housing part 6; a tension pulley 152 rotatably mounted around a shaft 152a parallel with the pivot shaft 8; and a coil spring 153 for applying a force to the tension pulley 152 via the slider 151 to move away from the side B.

The holding portions 66 of the tensioner-holding portion 63 of the second housing part 6 is in contact with the tension pulley 152 to hold the closing tensioner 15 provisionally not to fall off the tensioner-holding portion 63 when the driven subassembly is connected to the drive subassembly. The projection 151a of the slider 151 slides in the elongate hole 622 of the second housing part 6, and the projection 151b slides in the elongate hole 57 of the first housing part 5 to allow the slider 151 to slide between the first housing part 5 and the second housing part 6. The holding portion 66 is not in contact with the tension pulley 152 when the driven subassembly is connected to the drive subassembly.

In the opening cable 10, the end of the outer tube 101 is fixed to the cable-taking-out portion 67 of the second housing part 6. An inner cable 102 which slides in the outer tube 101 in the axial direction X1 is wound on the helical groove 122 of the drum 12 via the tension pulley 142. In the closing cable 11, the end of the outer tube 111 is fixed to the cable-taking-out portion 68 of the second housing part 6, and an inner cable 112 which slides in the outer tube 111 along the axis X2 is wound on the helical groove 122 of the drum 12 via the tension pulley 152.

The outer tube 101 of the opening cable 10 extends along the axis X1 from the second housing part 6 toward the rear end of the guide rail 2B, and the end of the outer tube 101 is fixed to a guide pulley 103 mounted at the rear end of the guide rail 2B. The inner cable 102 which is taken out from the end of the outer tube 101 extends along the guide rail 2B and is connected to the sliding door 1.

The outer tube 111 of the opening cable 11 extends along the axis X2 from the second housing part 6 across the opening cable 10 toward the front end of the guide rail 2B close to the drive unit 3, and is fixed to the guide pulley 113 at the front end of the guide rail 2B. The inner cable 112 taken out from the end of the outer tube 111 extends along the guide rail 2B and is connected to the sliding door 1.

When the electromagnetic clutch 13 is energized, the drum 12 rotates by the motor 7, one of the inner cable 102 of the opening cable 10 and the inner cable 112 of the closing cable 11 is wound onto the helical groove 122 of the drum 12, and the other is taken out to slide the door open or closed. When the electromagnetic clutch 13 is not energized or off, the rotor 21 is cut off the armature 22 to slide the door 1 open and closed manually without reversing the worm wheel 9 or motor 7.

Then, how to assemble the drive unit 3 will be described.

Figure 7:
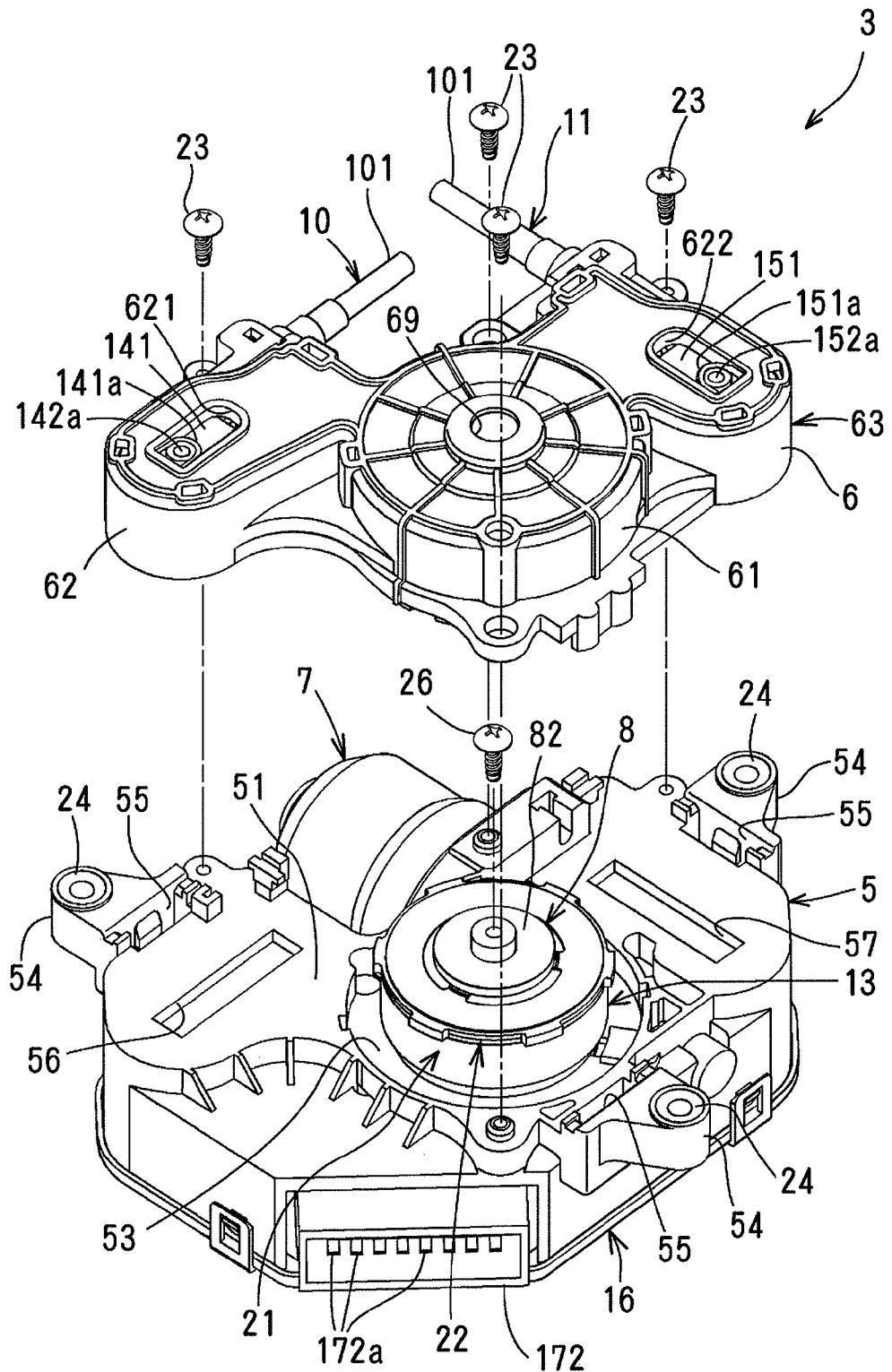
FIG. 7 is a perspective view of the drive subassembly and driven subassembly.
Figure 8:
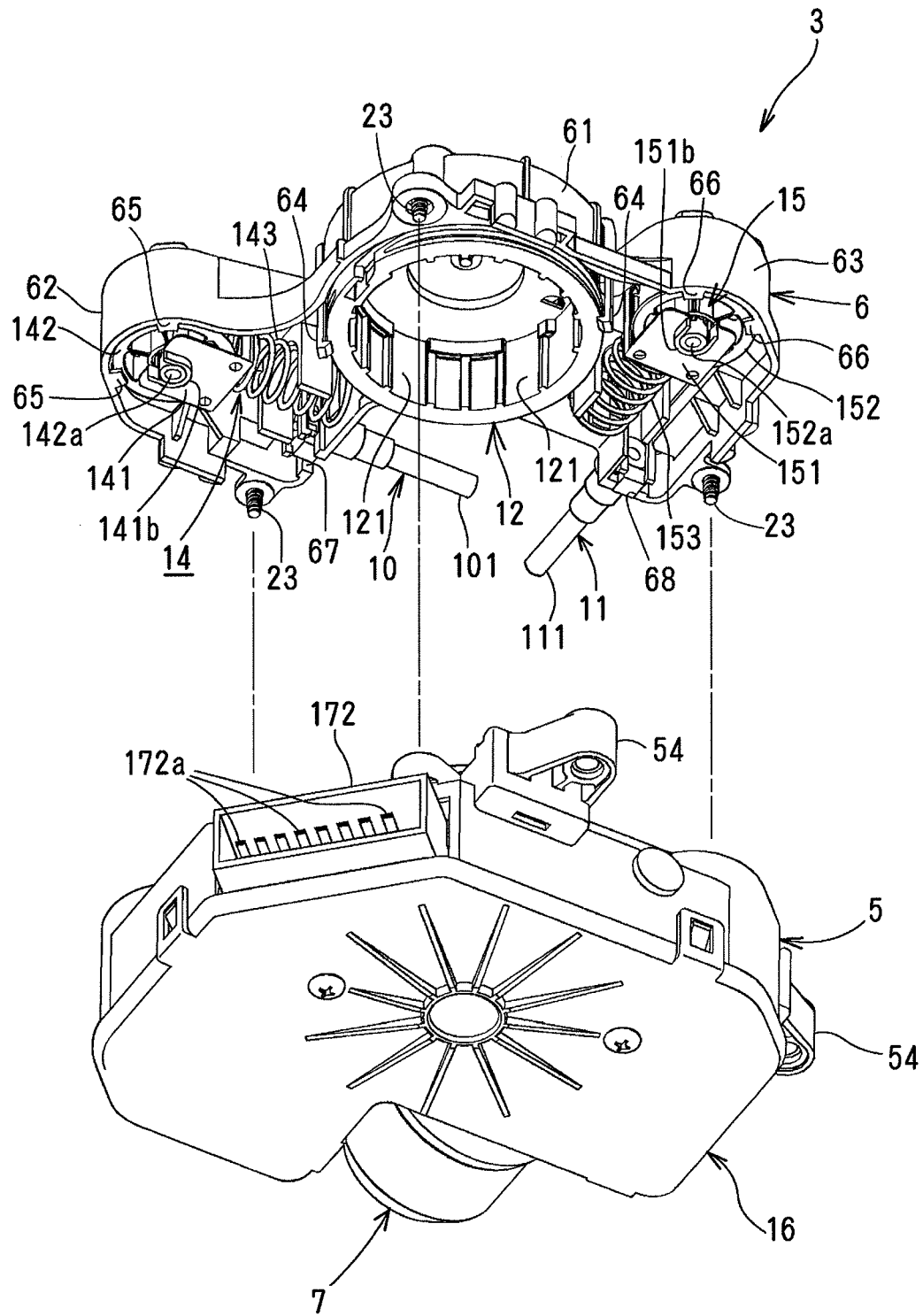
FIG. 8 is a perspective view of the drive subassembly and driven subassembly seen from a direction different from FIG. 7.

In FIGS. 7, 8 and 10, the drum 12, opening tensioner 14 and closing tensioner 15 are connected to the second housing part 6, and the outer tube 101 of the opening cable 10 and the outer tube 111 of the closing cable 11 are fixed to the cable-taken-out portions 67,68 of the second housing part 6. The inner cables 102,112 are wound on the helical grooves 122 of the drum 12 to form the driven subassembly. The motor 7, pivot shaft 8, worm wheel 9, electromagnetic clutch 13, printed circuit board 17 and rotary plate 18 are connected to the first housing part 5 to form the drive subassembly.

Then, in the final assembling step, the driven subassembly is put on the drive subassembly by putting the drum 12 over the electromagnetic clutch 13 along the pivot shaft 8, and the second housing part 6 is fixed to the first housing part 5 with the bolts 23, and the bolt 26 is tightened into the internal thread bore 81 of the pivot shaft 8 through the circular hole 69 of the second housing part 6 to allow the drum 12 to be coupled with the pivot shaft 8. Hence, the drive subassembly is connected to the driven subassembly, finally assembling the drive unit 3.

In the final assembling step, the drum 12 and tensioners 14,15 connected to the second housing part 76 are provisionally held with the holding portions 64,65,66, so that they are unlikely to fall or come off the second housing part 6. Hence, the driven subassembly can be connected to the drive subassembly more efficiently.

Figure 15:
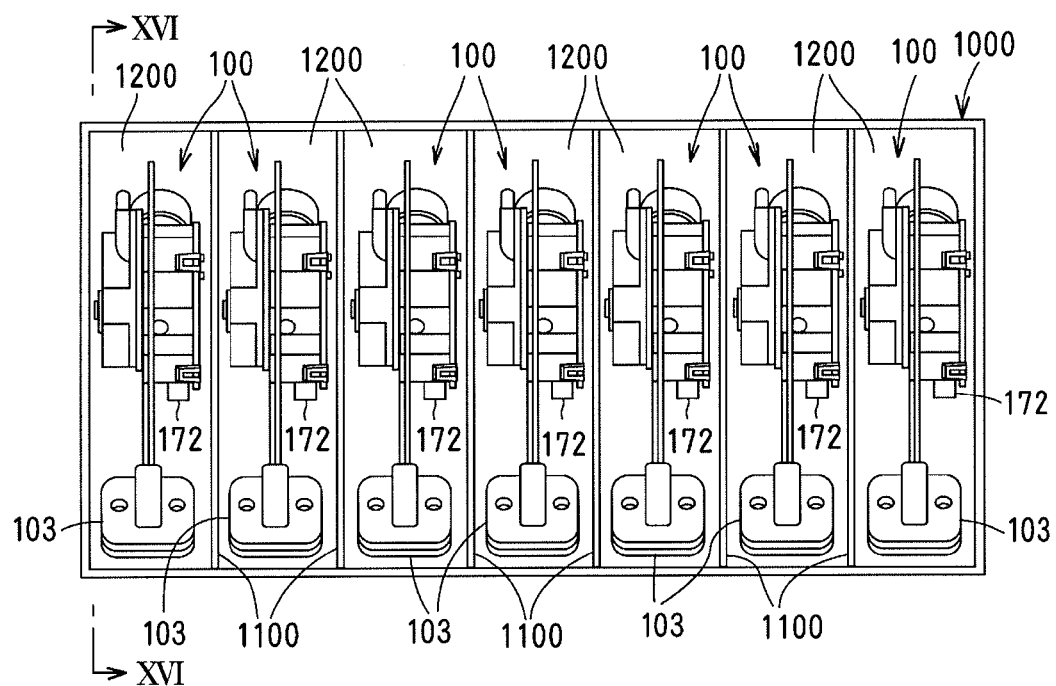
FIG. 15 is a top plan view showing packing of the vehicle opening devices in the first example.
Figure 16:
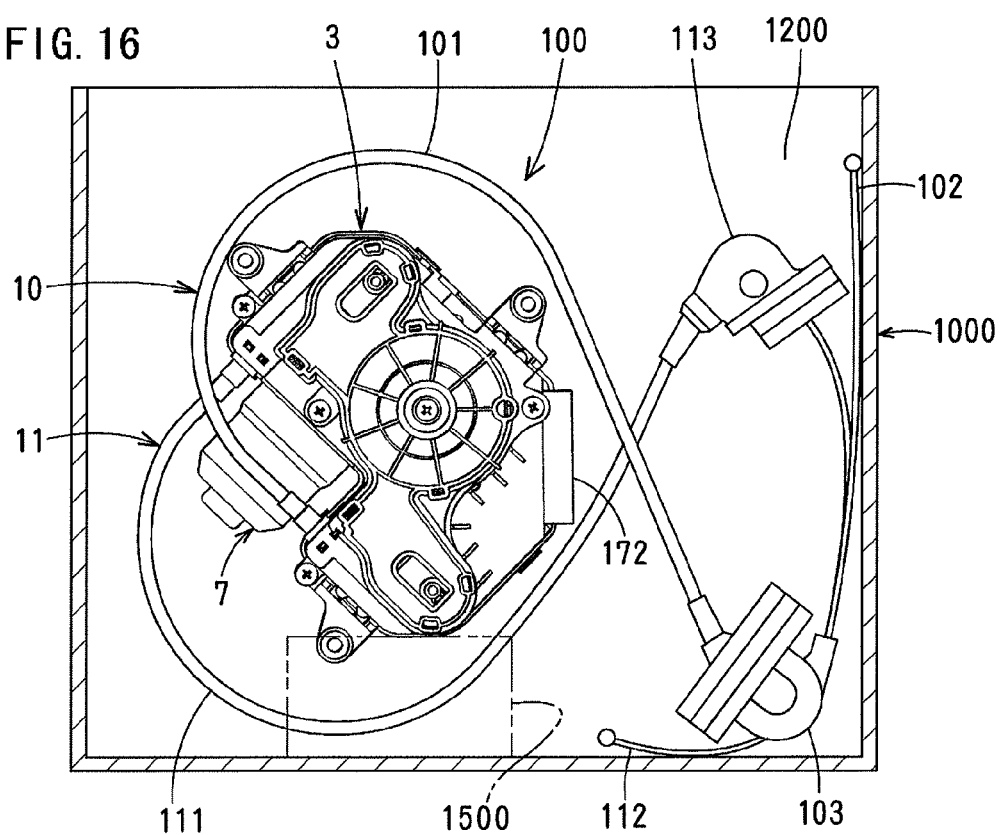
FIG. 16 is a vertical sectional view taken along the line XVI-XVI in FIG. 15.
Figure 17:
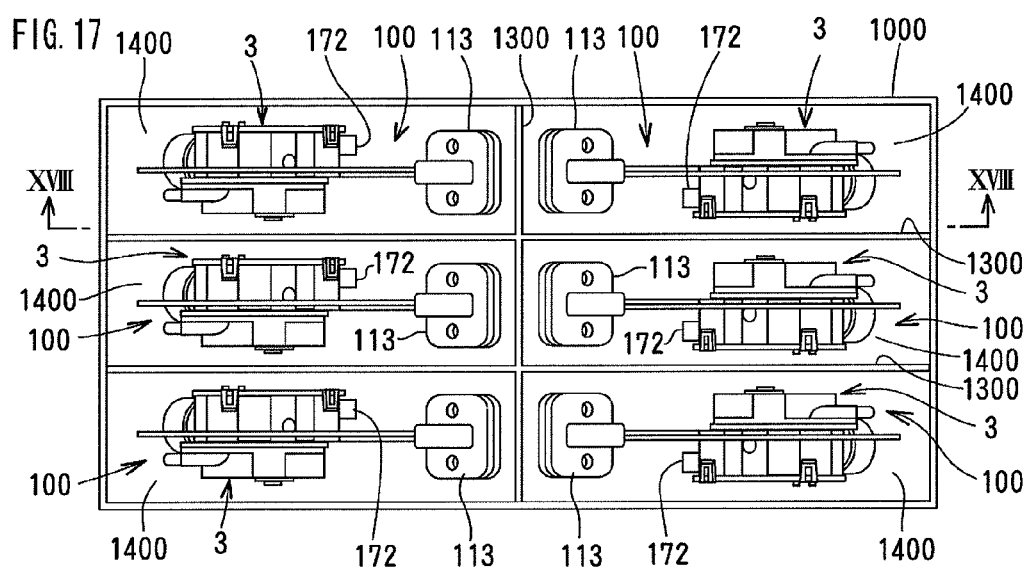
FIG. 17 is a top plan view showing packing of the vehicle opening devices in the second example.
Figure 18:
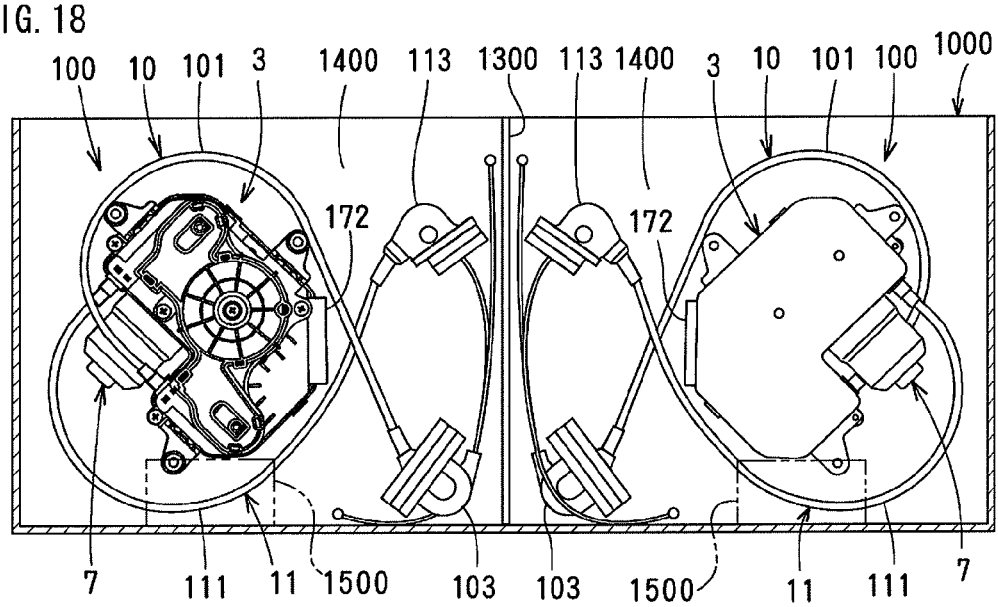
FIG. 18 is a vertical sectional view taken along the line XVIII-XVIII in FIG. 17.

Then, how to pack the vehicle door opening device 100 will be described with respect to FIGS. 15-18. FIG. 15 is a top plan view of a package in Example 1, and FIG. 16 is a vertical sectional view taken along the line XVI-XVI. FIG. 17 is a top plan view of a package in Example 2, and FIG. 18 is a horizontal sectional view taken along the line XVIII-XVIII in FIG. 17.

In Example 1, the vehicle door opening device is packed as below.

A package 1000 for packing the device is a rectangle in a plan view and a box that can be used again.

In FIG. 15, the package 1000 is separated by a plurality of partitions 1100 across its length into a plurality of storage spaces 1200 such as seven in FIG. 15.

In order to transport the packages 1000 which packs the vehicle door opening device 100 more efficiently, in FIG. 15, the drive unit 3 is stored in the storage space 1200 separated with a partition plate 1100. In order to keep dusts and moisture from coming into the connector during transportation of the packages 1000 and to keep the connector 172 from being damaged by direct contact with the bottom of the packages 1000 owing to vibration during transportation, in FIG. 16, an opening of the connector 172 faces laterally or obliquely downward, and the drive unit 3 is disposed in the storage space 1200 vertically. By storing buffers 1500 in the package 1000, a posture of the drive unit 3 to the package 1000 can be maintained thereby preventing the connector 172 from bumping against the bottom of the package 1000.

In order to shorten the storage space 1200, in FIG. 16, the opening cable 10 and closing cable 11 cross to each other at one end close to the drive unit 3 and at the other end where the guide pulley is fixed, and curve like a heart in a side view. Specifically, the opening cable 10 extends upward obliquely from the drive unit 3, and curves at the upper end like a U to allow the end fixed to the guide pulley 113 to direct obliquely downward to be in contact with the side wall of the package 1000. The closing cable 11 extends obliquely downward from the drive unit 3 and curves at the lower end like a U to allow the end fixed to the guide pulley 113 to direct obliquely upward to be in contact with the side wall of the package 1000. The cables 10,11 curve like a U to allow the vehicle door opening device 100 to be stored in the storage space 1200 separately longitudinally of the package 1000.

In the first example of packing, the vehicle door opening device 100 is packed side by side thereby transporting the devices more efficiently.

In the second example of packing, the vehicle door opening device 100 is packed as below.

A package 1000 for packing the vehicle door opening device 100 is a rectangle in a plan view similar to the first example and is a box that can be used again.

In FIG. 17, the package 1000 is separated into two divisions longitudinally and into three divisions transversely.

Similar to the first example, in order to transport the packages 1000 more efficiently, the device is stored in a storage space 1400 separated with partition plates 1300.

In order to keep dusts and water from coming into the connector 172 during transportation of the packages 1000 packing the vehicle door opening devices 100 and to prevent the connector 172 from being damaged owing to bumping against the bottom of the package 1000 by vibration during transportation, the drive unit 3 is stored vertically in the storage space 1200 such that an opening of the connector 172 directs laterally or obliquely downward in FIG. 18 similar to the first example.

In order to shorten the storage space, the opening cable 10 and closing cable 11 are curved in FIG. 18 similar to the first example.

In the second example, the vehicle door opening device 100 is stored and packed in a plurality of storage spaces 1400 separated longitudinally and laterally of the package 1000 thereby transporting the devices more efficiently.

By separately constructing the driven subassembly in which the drum 12, tensioners 14,15 and cables 10,11 are connected to the second housing 6 and the drive subassembly in which the motor 7, pivot shaft 8, worm wheel 9 and electromagnetic clutch 13 are connected to the first housing part 5, the driven subassemblies in which the cables 10,11 are disposed in different layout can selectively be connected to the drive subassembly between different types of vehicle. The driven subassembly corresponding to the type of vehicle is connected to the drive subassembly to enable the drive subassembly to be used together among different types of vehicle thereby reducing the costs.

Furthermore, as seen along the pivot shaft 8, the housing 4 is an approximately L-shaped polygon in which an exterior angle at at least the vertex A is almost right angles, and the motor 7 is mounted to the housing 4 such that the armature axis of the motor 7 is perpendicular to the side B of the two sides B,C having the vertex A at the end. Hence, in FIG. 4, the drive unit 3 can be formed as rectangle, thereby saving an occupation area of the drive unit 3 and transporting the drive units more efficiently.

The attaching portion 54 is directly attached to the vehicle body with the bolt 27. In order to attach the drive unit 3 to another type of vehicle, the bracket 28 or 29 can selectively be attached to the attaching portion 54. The drive unit 3 is directly fixed to the vehicle body or via the bracket 28 or 29 selectively depending on the type of vehicle. Between different types of car, the first housing part 5 of the housing 4 can be used.

The foregoing relates to embodiments of the present invention. Various changes and modifications may be made without departing from the scope of claims.

(1) The drive unit 3 may be mounted to the door 1.

(2) The motor 7 may be mounted to face the side C.

(3) The opening cable 10 may be taken out from the side B of the housing 4 in parallel with the axis of the motor 7, while the closing cable 11 is taken out from the side C of the housing 4.

(4) The door 1 may be a swinging door or a liftgate at the end of vehicle body instead of a sliding door.

What is claimed is:

1. A vehicle door opening device for opening and closing a door, the vehicle door opening device comprising:
    a drive unit comprising a housing, a motor mounted to the housing, and a drum rotatably mounted in the housing to be rotated by the motor, the housing comprising an approximately L-shaped polygon having two sides that meet at a vertex with an interior angle of approximately 270 degrees, the motor being attached to the housing such that an axis of the motor is perpendicular to one of the two sides of the L-shaped polygon;
    an opening cable for opening the door, the opening cable being wound onto and taken out of the drum in a direction perpendicular to the axis of the motor, an end of the opening cable being connected to the door to enable power of the motor to be transmitted to the door; and
    a closing cable for closing the door, the closing cable being wound onto and taken out of the drum in a direction in parallel with the axis of the motor, an end of the closing cable being connected to the door to enable the power of the motor to be transmitted to the door,
    wherein the closing cable crosses the opening cable at a position closer to the motor than the drum.

2. The vehicle door opening device of claim 1, further comprising positioned in the housing:
    an opening tensioner that applies tension to the opening cable at one side of the drum; and
    a closing tensioner that applies tension to the closing cable at the other side of the drum.

3. The vehicle door opening device of claim 2, further comprising positioned in the housing:
    a cylindrical drum holding portion holding the drum in the middle,
    an opening-tensioner holding portion holding the opening tensioner, and
    a closing tensioner holding portion holding the closing tensioner.

4. The vehicle door opening device of claim 1, wherein the housing comprises:
    a first housing part, and
    a second housing part fixed over the first housing part.

5. The vehicle door opening device of claim 4, further comprising positioned in the first housing part an attaching portion attached to a vehicle body.

6. The vehicle door opening device of claim 5, further comprising a bracket attached to the attaching portion of the first housing part so as to fix the housing to the vehicle body via the bracket.

7. The vehicle door opening device of claim 1, wherein the door is a sliding door.

* * * * *